H. H. TRENOR.
Car Brake.
No. 50,517.
Patented Oct. 17, 1865.
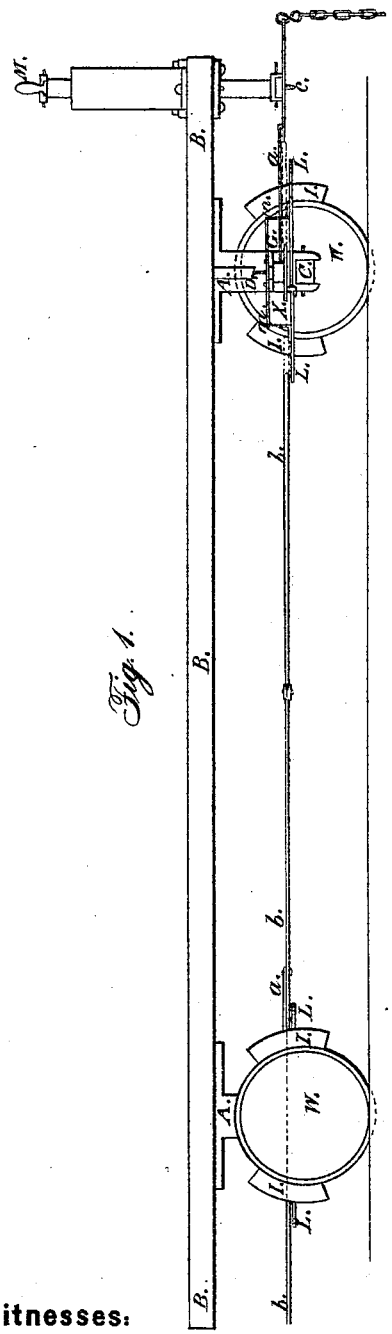

UNITED STATES PATENT OFFICE.

HENRY H. TRENOR, OF NEW YORK, N. Y.

IMPROVED CAR-BRAKE.

Specification forming part of Letters Patent No. 50,517, dated October 17, 1865.

*To all whom it may concern:*

Be it known that I, HENRY HUDSON TRENOR, of New York, in the county and State of New York, have invented certain new and useful Improvements in Brakes and Method of Applying the same; and I hereby declare that the following is such a full, clear, and exact description of the same as will enable others skilled in the art to make and use the same.

This invention relates to the construction and the connection with an operating mechanism of brakes of railroad-cars and other vehicles, and has for its object the effective and instantaneous application of the brakes to the wheel or wheels.

According to this invention the brakes are operated by an eccentric, which is arranged in relation to and combined with the brakes, so as to directly and instantaneously transmit to the brakes any movement imparted to it. Each wheel may be provided with one or two brakes diametrically opposite, and the brakes of each wheel may be actuated by one eccentric, or the brakes of two or more wheels or the brakes of all the wheels constituting a truck may be worked by one eccentric. This eccentric may be located in any convenient or suitable position, *i. e.*, vertically or horizontally, in the middle of the truck or upon the sides thereof, and may be made in the form of a disk or frame, or otherwise, as deemed most convenient.

To enable others to make and use my invention, I shall now proceed to describe in illustration thereof, the construction and operation of the brakes as applied to a four-wheel car-frame.

Referring to the drawings, Figure 1 is an elevation of the same, representing an exterior view of the forward wheels and brakes, and interior view of rear truck, exhibiting the off wheel and brake, the outer wheel being removed. Fig. 2 is a plan view of the same, looking up toward the platform or frame, the forward wheels being removed to show the construction of the brake and the brake-operating mechanism, while the rear truck is shown with the wheels and brakes complete.

The truck A, which in this instance is a two-wheel truck, is secured to the platform or carriage-frame B by means of a pivot, upon which it is capable of rotation, so as to adapt itself to the curves of the track.

Above and parallel with the axle C of the wheels W, and secured to the two pendent side brackets, D, is a cross-piece, G, carrying the eccentrics X and the brakes I. The former are round disks pivoted to the cross-piece at their centers and provided with eccentrically-arranged studs which engage the levers of the brakes. The latter are, or may be, of ordinary or suitable form and are held in place by means of curved levers L, which are pivoted to lugs *m* laterally projecting from the cross-piece.

The studs which give motion to the brakes are arranged on one or both faces of the eccentric disk. In this instance they are all on the under side of the disk, which is a horizontal one.

All the eccentric disks of the whole car are coupled by means of connecting-links *a* and rods *b*, and are connected with a crank, *c*, which is operated by a hand wheel or crank, M, from the platform.

It will be understood that a partial rotation of the crank or wheel on the platform will directly transmit the movement to eccentric disks through the intermediary of the connecting links or rods, and the disks in their turn will instantaneously operate the brakes, so that the laborious and slow winding up of a chain to close the brakes on the wheels is done away with. By this arrangement I am also enabled economically to apply and operate brakes on both sides of the periphery of the wheel.

The plan heretofore in use of working the brakes on the outer or on the inner periphery of the wheels had the tendency of crowding the wheels together or of forcing them asunder. This has been found to be destructive to the running-gear of cars. By my system of operating brakes the wheel is not deviated from its normal course nor submitted to any undue strain.

Another important advantage secured by my invention is that all the brakes of the whole train may be connected and operated simultaneously in the manner described, either by hand or by steam, by the brakeman or the engineer, so that in case of necessity the whole system of brakes may be placed under control of and operated by the engineer simultaneously.

Having thus described my invention, and the manner in which the same is or may be carried into effect, I claim—

Operating the brakes of railroad-carriages by means of eccentrics, substantially as herein described, whereby simultaneous action of the brakes may be effected on the wheels on either or all the cars of a train, said brakes acting so that each wheel shall receive pressure on opposite sides of its periphery.

In testimony whereof I have signed my name to this specification before two subscribing witnesses.

HENRY H. TRENOR.

Witnesses:
    JOS. L. COOMBS,
    A. POLLOK.